(12) United States Patent
D'Angio et al.

(10) Patent No.: US 12,058,146 B2
(45) Date of Patent: Aug. 6, 2024

(54) SYSTEMS AND METHODS FOR GENERATING TRUST METRICS FOR SENSOR DATA

(71) Applicant: Booz Allen Hamilton Inc., McLean, VA (US)

(72) Inventors: Paul D'Angio, Pittsburgh, PA (US); Randy Yamada, Arlington, VA (US); Natasha Norris, Herndon, VA (US); Jon Duntze, Herndon, VA (US)

(73) Assignee: BOOZ ALLEN HAMILTON INC., McLean, VA (US)

(*) Notice: Subject to any disclaimer, the term of this patent is extended or adjusted under 35 U.S.C. 154(b) by 689 days.

(21) Appl. No.: 16/919,814

(22) Filed: Jul. 2, 2020

(65) Prior Publication Data

US 2021/0005332 A1 Jan. 7, 2021

Related U.S. Application Data

(60) Provisional application No. 62/870,481, filed on Jul. 3, 2019.

(51) Int. Cl.
*H04L 67/12* (2022.01)
*G16Y 40/35* (2020.01)
*G16Y 40/50* (2020.01)
*H04L 9/40* (2022.01)

(52) U.S. Cl.
CPC ......... *H04L 63/1408* (2013.01); *G16Y 40/35* (2020.01); *G16Y 40/50* (2020.01); *H04L 63/1441* (2013.01); *H04L 67/12* (2013.01)

(58) Field of Classification Search
CPC ............. H04L 63/1408; H04L 63/1416; H04L 63/1441; H04L 67/12
See application file for complete search history.

(56) References Cited

U.S. PATENT DOCUMENTS

| | | | |
|---|---|---|---|
| 8,922,427 B2 | 12/2014 | Dehnie et al. | |
| 10,086,782 B1* | 10/2018 | Konrardy | G05B 15/02 |
| 10,466,700 B1* | 11/2019 | Carmack | G08G 5/0069 |
| 2011/0154497 A1* | 6/2011 | Bailey, Jr. | H04L 63/1433 726/25 |
| 2013/0063282 A1* | 3/2013 | Baldwin | B61L 29/282 340/941 |
| 2014/0301550 A1* | 10/2014 | Lewis | H04L 9/0822 380/259 |

(Continued)

*Primary Examiner* — William G Trost, IV
*Assistant Examiner* — Adam A Cooney
(74) *Attorney, Agent, or Firm* — Buchanan Ingersoll & Rooney PC

(57) ABSTRACT

A method for generating trust metrics for sensor data is disclosed. The method can include receiving the sensor data from at least one sensor associated with a platform; categorizing the sensor data into one or more sensor data types; applying one or more threat detection algorithms to the sensor data based on the one or more sensor data types to detect one or more threats to the integrity of the sensor data; calculating a detection certainty for the sensor data from the at least one sensor, the detection certainty indicating a probability that the one or more threats are affecting the integrity of the sensor data; and generating a trust metric for the sensor data of the at least one sensor based on the detection certainty for the sensor data from the at least one sensor.

46 Claims, 7 Drawing Sheets

(56) References Cited

U.S. PATENT DOCUMENTS

| | | | |
|---|---|---|---|
| 2015/0332054 A1* | 11/2015 | Eck | H04L 63/1416 |
| | | | 726/25 |
| 2018/0191758 A1* | 7/2018 | Abbaszadeh | H04L 63/1441 |
| 2019/0186962 A1* | 6/2019 | Tomatsu | G01D 18/008 |
| 2019/0243002 A1* | 8/2019 | Song | G01S 19/20 |
| 2019/0342322 A1* | 11/2019 | Boulton | H04W 12/66 |
| 2019/0353502 A1* | 11/2019 | Doshi | G01D 21/00 |
| 2020/0089885 A1* | 3/2020 | Kling | G06F 21/566 |
| 2020/0094847 A1* | 3/2020 | Goldman | G08G 1/09623 |

* cited by examiner

SYSTEMS AND METHODS FOR GENERATING TRUST METRICS FOR SENSOR DATA

FIELD

Aspects of the present disclosure provide systems and methods for detecting and analyzing evolving threats of various threat types to sensor data through threat libraries, and more particularly to generating a trust metric to measure sensor data trustworthiness and increase sensor resiliency.

BACKGROUND INFORMATION

A significant number of government and commercial operations depend on reliable and trusted access to information measured and provided by sensors (hereinafter referred to as "sensor data"). Sensor data may include one or more datapoints from one or more sensors. For example, sensor data may include, but is not limited to Position, Navigation, and Timing (PNT) data from PNT sensors, operational and environmental data from Industrial Control System (ICS) sensors, and object detection data from object detection sensors, etc. Adversaries recognize this dependence and continuously threaten systems and networks with evolving attacks on the availability and integrity of sensor data. These attacks use an increasing number of different methods, and continuously and rapidly adapt over time to exploit newly discovered vulnerabilities and defeat defense techniques. The cost and complexity of technology required to develop threat capabilities and to attack systems and networks continue to fall, and as a result, threats of various threat types are becoming more widespread and executed with higher rates of success. Threat capabilities are now readily available to the general public, and no longer limited to highly sophisticated individuals and state actors. Today's threat detection and mitigation technology is critically unable to keep up with the evolution and spread of threats to the integrity and availability of sensor data. Many sensors have no internal capability for defensively detecting and mitigating attacks. Sensors that do have internal detection/mitigation capabilities are often unable or too slow to update their internal detection/mitigation capabilities in a timely manner, making them vulnerable to new and evolving threats.

Aspects of the present disclosure disclose systems and methods to improve and expand current threat detection, analysis, and mitigation capabilities to defend against these new and evolving threats.

SUMMARY

A method for generating trust metrics for sensor data is disclosed. The method can include receiving the sensor data from at least one sensor associated with a platform; categorizing the sensor data into one or more sensor data types; applying one or more threat detection algorithms to the sensor data based on the one or more sensor data types to detect one or more threats to the integrity of the sensor data; calculating a detection certainty for the sensor data from the at least one sensor, the detection certainty indicating a probability that the one or more threats are affecting the integrity of the sensor data; and generating a trust metric for the sensor data of the at least one sensor based on the detection certainty for the sensor data from the at least one sensor.

A system for generating trust metrics for sensor data is disclosed. The system can include at least one sensor that provides sensor data associated with a platform; a resilience engine including: a categorization module to categorize the sensor data into one or more sensor data types, and to apply one or more threat detection algorithms to the sensor data based on the one or more sensor data types to detect one or more threats to the integrity of the sensor data; an integrity monitor module configured to calculate a detection certainty for the sensor data of one or more sensor data types of one or more of the at least one sensor, the detection certainty indicating a probability that the one or more threats are affecting the integrity of the sensor data of one or more sensor data types; and a trust module configured to calculate a trust metric for the sensor data of the at least one sensor based on the detection certainty for the sensor data from the at least one sensor.

A computer program product for generating a trust metric for sensor data is disclosed. The computer program product can include a computer-readable storage medium having program instructions embodied therein, the program instructions being executable by a computer to cause the computer to perform a method which includes: receiving the sensor data from at least one sensor associated with a platform; categorizing the sensor data into one or more sensor data types; applying one or more threat detection algorithms to the sensor data based on the one or more sensor data types to detect one or more threats to the integrity of the sensor data; calculating a detection certainty for the sensor data from the at least one sensor, the detection certainty indicating a probability that the one or more threats are affecting the integrity of the sensor data; and generating a trust metric for the sensor data of the at least one sensor based on the detection certainty for the sensor data from the at least one sensor.

A method for updating a threat library locally stored on a platform (a "deployed threat library") is disclosed. The method can include receiving sensor data from at least one sensor associated with the platform; establishing a connection between the deployed threat library and a threat library that is remotely located from the platform (a "remote threat library") where each remote threat library stores one or more threat detection algorithms; obtaining from the remote threat library one or more threat detection algorithms associated with the at least one sensor; and updating the deployed threat library with the obtained one or more threat detection algorithms.

A system for updating a local threat library deployed on a platform is disclosed, where the platform includes at least one associated sensor configured to provide sensor data, and the system includes a resilience engine configured to categorize the sensor data into one or more sensor data types, and to apply one or more threat detection algorithms to the sensor data based on the one or more sensor data types to detect one or more threats to the integrity of the sensor data from the at least one sensor, and to obtain threat detection algorithms pertaining to the at least one sensor from a remote threat library that contains one or more threat detection algorithms associated with the at least one sensor; and to update the deployed threat library associated with the platform with the obtained one or more threat detection algorithms.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which.

Further areas of applicability of the present disclosure will become apparent from the following detailed description. It should be understood that the detailed descriptions of exemplary embodiments are intended for illustration purposes only and are not intended to limit the scope of the disclosure.

DETAILED DESCRIPTION

The present disclosure provides novel methods and systems for enabling rapid development and deployment of threat detection/mitigation technologies allowing sensor systems to stay protected in continuously evolving threat environments. Current threat detection/mitigation is critically unable to keep up with the evolution and spread of attacks on the availability and integrity of sensor data. Further, many current sensors have no internal capabilities for defensively detecting and mitigating attacks. Currently, sensors that do have internal detection/mitigation capabilities are often unable or very slow to update their internal detection/mitigation capabilities to address new and evolving threats, making them vulnerable to those threats. The methods and systems herein provide a novel solution, not addressed by current technology, that provides consumers (e.g., human users or machines reliant on sensor data) with real-time measures of trust in sensor data as well as real-time information on detected threats of various threat types, thus, allowing the consumer to make more informed decisions when using the sensor data. Exemplary embodiments of the methods and systems provided herein utilize threat detection algorithms to analyze sensor data and generate trust metrics at the data, sensor, and sensor system levels. Exemplary embodiments are capable of leveraging the redundancy of multi-sensor systems to detect and analyze threats to sensors and to mitigate the effects of threats in real-time, thus providing more robust sensor data to be used with a calculated confidence even in the presence of active threats. Further, exemplary embodiments of the methods and systems provided herein enable platforms to update their local threat libraries by obtaining threat detection algorithms from remote threat libraries which are constantly updated for new or changing threats of various threat types. Thus, the methods and systems provided herein are modular, scalable, and vendor-agnostic, allowing for rapid and low-cost adoption and integration across platforms, systems, and applications.

Figure 1A:
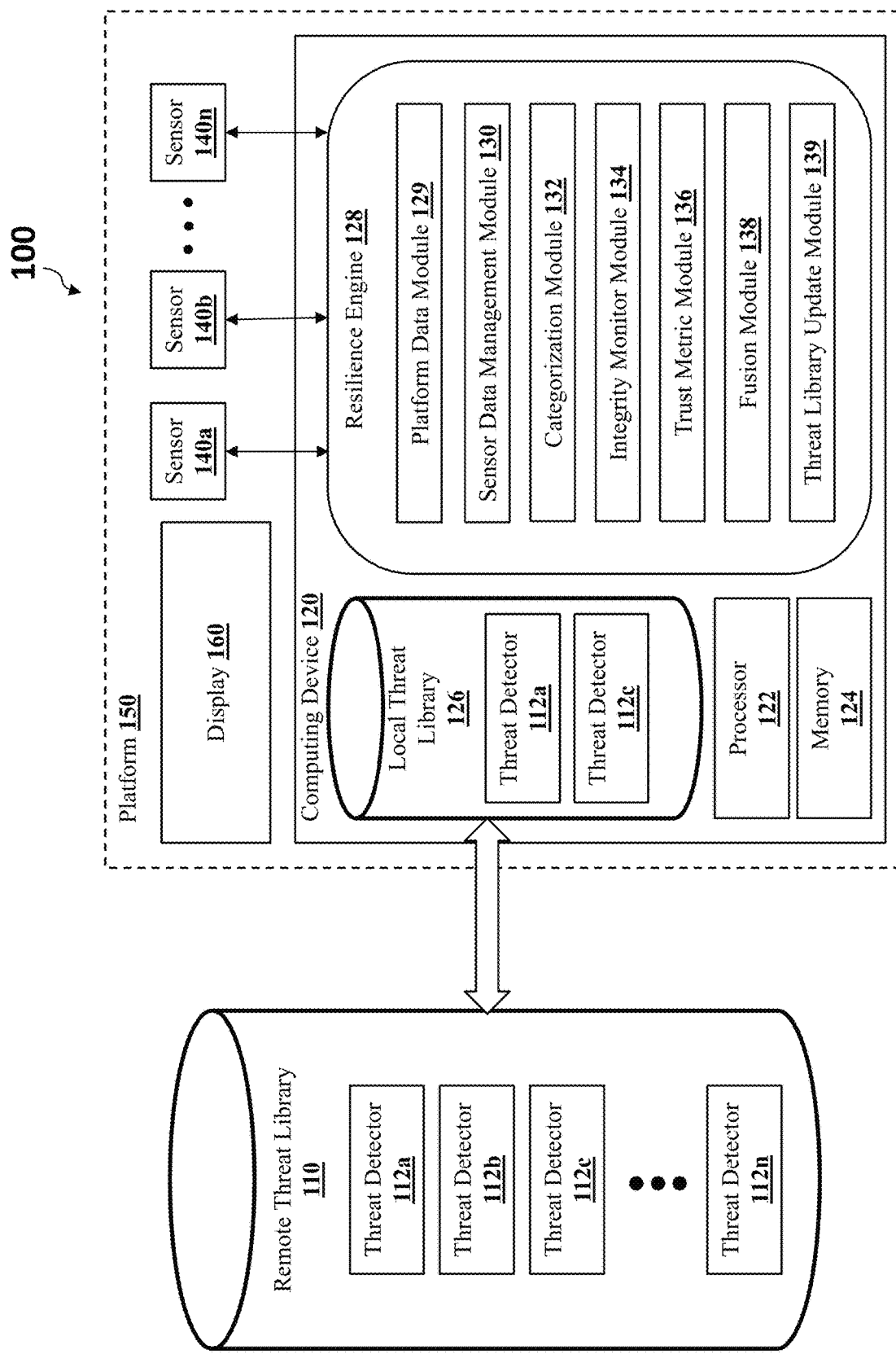
FIG. 1a illustrates a system for generating a trust metric for sensor data in accordance with exemplary embodiments.

FIG. 1a illustrates an exemplary system 100 for generating a trust metric for sensor data in accordance with exemplary embodiments. The system 100 includes a remote threat library 110, computing device 120, sensors 140a-n, platform 150, and display 160.

Figure 1B:
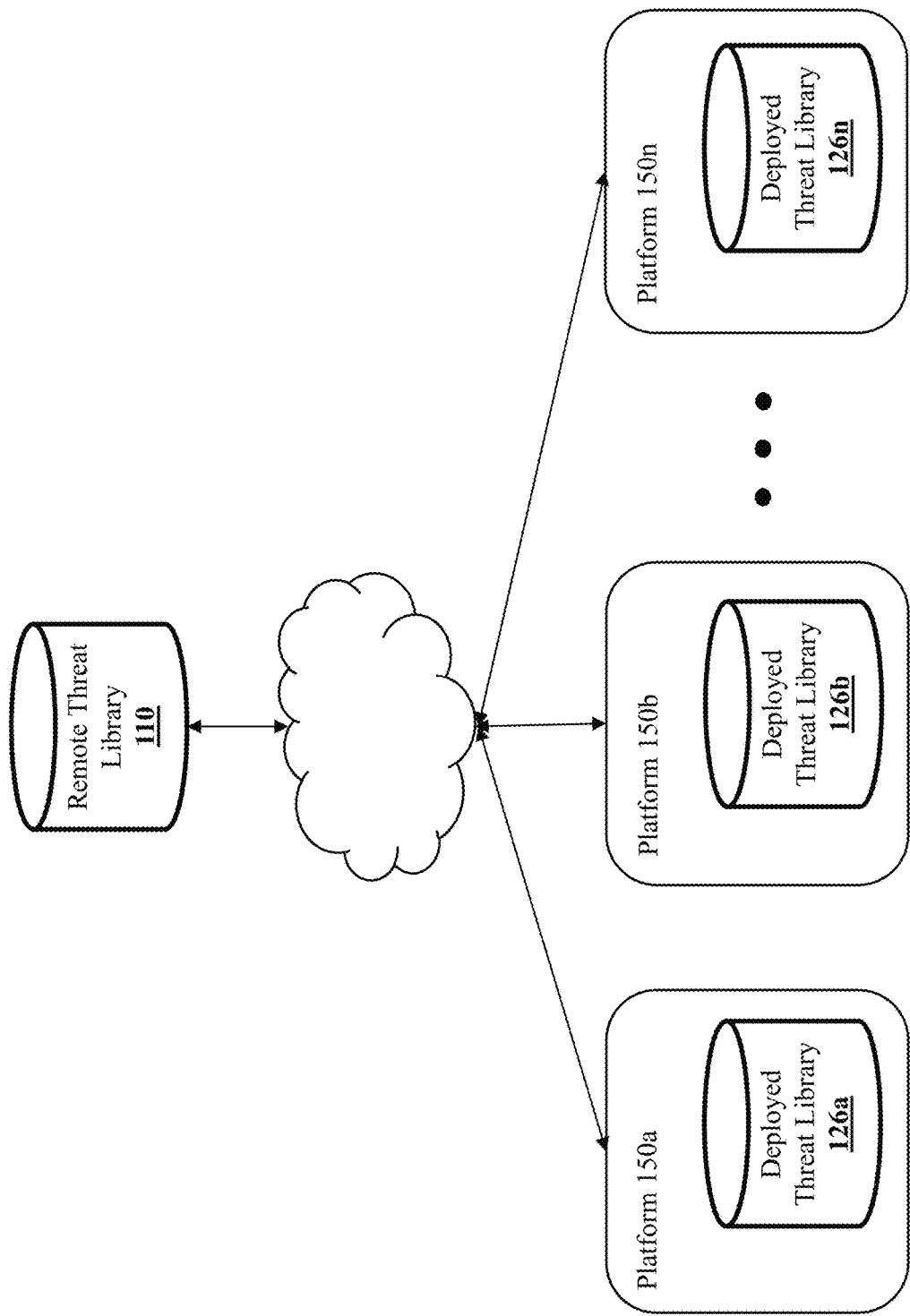
FIG. 1b illustrates a system for generating a trust metric for sensor data in accordance with exemplary embodiments.

The remote threat library 110 includes one or more threat detectors 112a-n. The remote threat library 110 can be deployed on one or more nodes, e.g., storage or memory nodes, or more processing-capable nodes such as a server computer, desktop computer, notebook, laptop computer, tablet computer, handheld device, smart-phone, thin client, or any other electronic device or computing system capable of storing, compiling, and/or processing data and computer instructions, e.g., the threat detectors 112a-n, and receiving and sending that data to and from other computing devices, such as the computing device 120, the local threat library 126, and the platform 150. The remote threat library 110 is a collection of algorithms for detecting currently known threats which is constantly updated as new and evolving threats are identified around the world from various sources, such as sensors, computers, publications, other threat libraries, etc. For example, developers and engineers can create new threat detectors 112a-n and add them to the remote threat library 110, and/or make updates to existing threat detectors 112a-n already in the remote threat library 110. The remote threat library 110 can be any suitable database configuration, such as a relational database, a structured query language (SQL) database, a distributed database, or an object database, etc. Suitable configurations and storage types will be apparent to persons having skill in the relevant art. In an exemplary embodiment, the remote threat library 110 is a cloud-hosted, globally available repository of the threat detectors 112a-n. This remote threat library 110 provides global access, via the internet or any other suitable network, to a collection of validated threat detectors 112a-n that are updated regularly to keep up with new and evolving threats. For example, referring to FIG. 1b, the remote threat library 110 may provide access to a collection of threat detectors to different platforms 150a-n. While only a single remote threat library 110 is illustrated, it can be appreciated that any number of remote threat libraries can exist. For example, there may be a remote threat library 110 for each of a plurality of customers, a remote threat library 110 for each of a plurality of government classification levels, a remote threat library 110 for a single logical grouping of threats, a remote threat library for a type or model of sensor or system, a remote threat library 110 provided by a source of threat detection algorithms, etc. Further, it can be appreciated that the remote threat library 110 and the local threat library 126, discussed in more detail below, may be a single threat library which can be either remote from the platform 150 or deployed locally on the platform 150 or otherwise connected to the platform 150.

The threat detectors 112a-n are algorithms implemented in software components that process sensor data from one or more of the sensors 140a-n in real-time in order to detect one or more threats that may be affecting the integrity of the sensor data. For example, when a sensor, e.g., one of the sensors 140a-n, is being attacked by a threat, the threat detectors 112a-n may detect a change in the behavior of the sensor or characteristics of the sensor's data, and the threat detectors 112a-n can identify and characterize the threats according to threat type. The threat detectors 112a-n implement one or more threat detection algorithms to detect one or more threats to the integrity of the sensor data of one or more of the sensors 140a-n. In an exemplary embodiment the threat detectors 112a-n are in the form of software plugins, e.g., code with a standardized interface that has been compiled into a dynamically-linked software library such as a .so or .dll file. The threat detectors 112*a*-*n* can use a host software program, such as the resilience engine 124 described below, to load the threat detectors 112*a*-*n* as a plugin, e.g., an object-oriented programming (OOP) class object, to be executed. Each of the threat detectors 112*a*-*n* is designed to identify a particular threat or set of threats for particular sensor types, such as the sensors 140*a*-*n*, and data types. Thus, a system, e.g., the platform 150, with multiple types of sensors, e.g., sensors 140*a*-*n*, expecting to be attacked by multiple types of threats would use multiple threat detectors, e.g., more than one of the threat detectors 112*a*-*n*. For example, a GPS sensor may be attacked using matched-power spoofing or over-powered spoofing; thus, there may be a threat detector 112 for each of a matched-power GPS spoofing attack and an over-powered GPS spoofing attack. The threat detectors 112*a*-*n* can calculate a detection certainty for threats to the integrity of the sensor data of each of one or more of the sensors 140*a*-*n* indicating a probability that one or more threats are affecting the integrity of the sensor data of each analyzed sensor and/or data type of the sensor's sensor data. For example, the detection certainty may be a percentage number from 0%, indicating no threat has been detected affecting data integrity, to 100%, indicating absolute certainty a threat is affecting data integrity, or a weighted number from 0-1, or any other suitable scale. Further, the threat detectors 112*a*-*n* may characterize the one or more threats to the integrity of the sensor data of one or more sensors 140*a*-*n*. For example, but not limited to, the threat detectors 112*a*-*n* may identify the direction the threat is coming from, the power level of the threat, and/or a known actor executing the threat, etc. Each threat may be assigned a unique identification, e.g., a Threat ID, which allows the threat detectors 112*a*-*n* to link sensor detection certainties and threat characterizations.

The platform 150 can be an object or device (military, civilian, consumer, or otherwise) such as, but not limited to, a vehicle, drone, plane, ship, satellite, smartphone, robot, medical device, appliance, industrial control system, infrastructure control system, network security system, network monitoring system, autonomous system, etc. The platform 150 may include the computing device 120, the sensors 140*a*-*n*, and the display 160. While the computing device 120 and the display 160 are illustrated as separate devices, it can be appreciated that the computing device 120 and the display 160 may be contained within a single device or multiple devices. Further, while the computing device 120, the sensors 140*a*-*n*, and the display 160 are illustrated as part of the platform 150, it can be appreciated that the computing device 120, the sensors 140*a*-*n*, and the display 160, or any combination thereof, may be remote from, or otherwise associated with, the platform 150.

The computing device 120 includes, for example, a processor 122, a memory 124, a local threat library 126, and a resilience engine 128. The computer device 120 may be a server computer, desktop computer, notebook, laptop computer, tablet computer, handheld device, smart-phone, thin client, or any other electronic device or computing system capable of storing, compiling, and/or processing data, e.g., sensor data from the sensors 140*a*-*n*, and receiving and sending that data to and from other computing devices, such as the display 160 and the remote threat library 110. The computing device 120 may be any stationary or mobile system located on the platform 150 such as, but not limited to, a handheld GPS, missile guidance system, UAV autopilot/flight control, ship navigation system, vehicle navigation system, satellite attitude control system, etc. While a single computing device 120 is illustrated, it can be appreciated that any number of computing devices may be a part of the platform 150. Further, while the local threat library 126 and the resilience engine 128 are illustrated as part of the same computing device 120, it can be appreciated that the local threat library 126 and the resilience engine 128 may be part of separate computing devices on the platform 150.

The processor 122 may be a special purpose or general purpose processor device specifically configured to perform the functions discussed herein. The processor 122 unit or device as discussed herein may be a single processor, a plurality of processors, or combinations thereof. Processor devices may have one or more processor "cores." In an exemplary embodiment, the processor 122 is configured to perform the functions associated with the modules of the resilience engine 128 as discussed below with reference to FIGS. 3-7.

The memory 124 can be a random access memory, read-only memory, or any other known memory configurations. Further, the memory 124 can include one or more additional memories on which the local threat library 126 may be located in some embodiments. The memory and the one or more additional memories can be read from and/or written to in a well-known manner. In an embodiment, the memory and the one or more additional memories can be non-transitory computer readable recording media. Memory semiconductors (e.g., DRAMs, etc.) can be means for providing software to the computing device such as the resilience engine 128. Computer programs, e.g., computer control logic, can be stored in the memory 124. The local threat library 126 is a local collection of the threat detectors 112*a*-*n* that are relevant, e.g., threat detectors 112*a* and 112*c*, to the sensors 140*a*-*n* connected to the platform 150. For example, referring to FIG. 1*b*, the platform 150*a* may not contain a GPS sensor and thus the local threat library 126*a* would not contain a GPS-specific threat detector. The local threat library 126 may continuously synchronize with the remote threat library 110 via the resilience engine 128 to ensure the local threat library's stored collection of the threat detectors 112*a*-*n* is kept up to date with the latest available versions of the threat detectors 112*a*-*n* (new or updated threat detectors applicable to previously existing or new sensors associated with the platform) stored in the remote threat library 110. As discussed above, it can be appreciated that the remote threat library 110 and the local threat library 126 may be a single threat library which can be either remote from the platform 150 or deployed locally on the platform 150, or otherwise connected to the platform 150.

The resilience engine 128 is a software component that downloads the threat detectors 112*a*-*n* from the remote threat library 110 and runs the threat detectors 112*a*-*n* against sensor data received from the sensors 140*a*-*n*. In an exemplary embodiment, the resilience engine 128 includes a platform data module 129, a sensor data management module 130, a categorization module 132, an integrity monitor module 134, a trust metric module 136, a fusion module 138, and a threat library update module 139. The resilience engine 128 is a software component specifically programmed to implement the methods and functions disclosed herein for generating trust metrics for sensor data and updating the local threat library 126 deployed on the platform 150. The resilience engine 128 and the modules 129-138 are discussed in more detail below with reference to FIGS. 2-7.

The sensors 140*a*-*n* as described herein can be a device which detects or measures a physical property (e.g., changes in environment) and records, indicates, and/or responds to it. In exemplary embodiments, the sensors can be, for example, but not limited to, mounted on the platform 150, external to the platform 150, or otherwise directly or indirectly associated to the platform 150. For example, one platform may have sensors mounted on it or otherwise connected to it and may transmit the sensor data (raw/pre-processed or processed) from those sensors to another platform 150. The sensors 140*a-n* can include at least one of, a plurality of, or a combination of, a global positioning system (GPS) sensor, an inertial measurement unit (IMU) sensor, an optical sensor, a magnetometer, RADAR, a network traffic monitor, a network management sensor, a network security sensor, etc. Further, it can be appreciated that the sensor 140 and the platform 150 can be the same device. For example, the platform 150 can be a smart sensor capable of monitoring its own sensor data and implementing the methods and functions disclosed herein for generating trust metrics for sensor data and updating the local threat library 126 deployed on the platform 150/sensor 140. Of course, these are a few examples, and there are many other types of sensors in connection with which the present systems and methods can also be used to analyze and detect threats to the integrity of corresponding sensor data.

The display 160 can be any computing device capable of receiving display signals from another computing device, such as the computer device 120, and outputting those display signals to a display unit such as, but not limited to, an LCD screen, plasma screen, LED screen, DLP screen, CRT screen, etc. While the display device 160 is illustrated as being separate from the computer device 120, it can be appreciated that the display 160 can be a part of the computer device 120.

Figure 2:
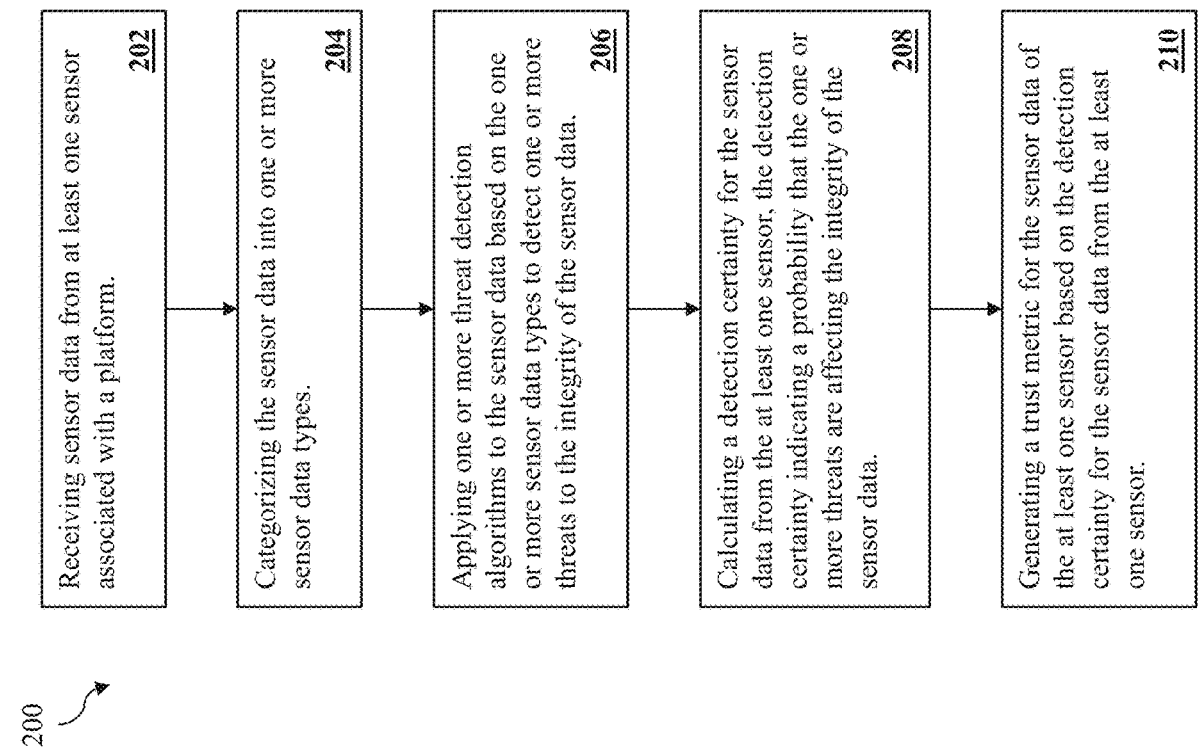
FIG. 2 illustrates an exemplary flowchart of a method for generating a trust metric for sensor data in accordance with exemplary embodiments.

FIG. 2 illustrates a flowchart of an exemplary method 200 for generating a trust metric for sensor data in accordance with exemplary embodiments. The method can provide real-time measures of confidence with respect to the integrity of sensor data. The method can provide to the consumer real-time technical and/or summary characterizations of the current threat environment to the integrity of the sensor data. For example, the method can provide to the consumer of PNT sensor data real-time technical and/or summary characterizations of the current threat environment to the integrity of the PNT data. The method can leverage available mission planning information to contextually improve threat detection, trust calculation, and threat mitigation performance. The method can log raw sensor data to support post-mission analysis and future development and/or tuning of detection methods.

In an exemplary embodiment as illustrated in FIG. 2, the method 200 can include block 202 of receiving sensor data from at least one sensor, e.g., the sensor 140*a* associated with the platform 150 in FIG. 1*a*. The resilience engine 128 in FIG. 1*a* may receive the sensor data from at least one sensor 140. The resilience engine may continuously receive the sensor data from the at least one sensor 140 in real-time. For example, the platform 150 may be a commercial airplane equipped with a plurality of sensors 140 such as, two GPS sensors, an IMU sensor, and a RADAR. The commercial airplane may also be equipped with a resilience engine, which collects the sensor data from the two GPS sensors, the IMU sensor, and the RADAR. In an embodiment, the sensor data can include data and information received from or regarding one or more sensors 140*a-n* associated with one or more systems of the platform 150. Continuing with the example above, the platform 150 may be a commercial airplane equipped with an auto-pilot system and a communications system and each of the auto-pilot system and the communications system may include one or more sensors 140*a-n*. Further, the sensor data may be received from another platform 150. For example, the commercial airplane may receive sensor data, e.g., weather data, from a control tower, etc. In an exemplary embodiment, the sensor data management module 130 can be configured to execute the method of block 202.

Further, the sensor data collection module 130 can serve as an interface to the sensors 140*a-n* connected to the platform 150 illustrated in FIG. 1*a*. The sensor data management module 130 may be pre-configured to work with specific sensors connected to the platform 150, or the sensor data management module 130 may interface with plug-and-play systems for real-time reconfiguration. The sensor data management module 130 may store, e.g., in the memory 124, information about the sensors 140*a-n* connected to the platform 150, such as, but not limited to, sensor type, sensor manufacturer, sensor data types provided, sensor data rates, etc. The sensor data management module 130 may provide this information to other components of the resilience engine 128. In exemplary embodiments, the sensor data management module 130 may receive the sensor data from the sensors 140*a-n* via UDP or any other suitable interface such as, but not limited to, TCP, serial, USB, I2C, SPI, UART, etc. It can be appreciated that storing all the sensor data within the memory 124 by the sensor data management module 130 for other components of the resilience engine 128 to access means that sensor data does not have to be copied; this is an optimization that minimizes memory usage on the computing device 120 that hosts the resilience engine 128 to maximize storage space for unique sensor data. Other components of the resilience engine 128 reference the data stored within the memory 124 and may not need to make copies of it. The sensor data management module 130 may store the sensor data for each sensor 140 in a "window," which contains N amount of the most recently captured sensor data from the sensor 140. N, or the window size, is determined by the needs of the components of the resilience engine 128 accessing the sensor data stored on the memory 124 by the sensor data management module 130. When a component of the resilience engine 128 needs a particular type of data from a particular sensor 140, it registers with the sensor data management module 130. By registering, the component tells the sensor data management module 130 what specific sensor data is needed, and what window size N of sensor data is needed. The component can also provide a callback function, which the sensor data management module 130 uses to notify the component that new sensor data has been captured and is available to be read from the sensor data management module 130. The sensor data management module 130 may keep track of component data registrations, and store/maintain only the amount of sensor data that is needed by the registered components. For example, if the categorization module 132 needs a window size of 20 points from the sensor 140*a*, and the integrity monitor module 134 needs a window size of 30 points from the sensor 140*a*, then the sensor data management module 130 will store only the most recent 30 data points from sensor 140*a*, and discard any sensor data older than that. In exemplary embodiments, the sensor data management module 130 will retain sensor data that is older than the window corresponding to a first component of the resilience engine if the sensor data is not older than the window corresponding to a second component of the resilience engine and, therefore, still in use by the second component of the resilience engine 128. Once the sensor data management module has identified sensor data as being sufficiently aged so as to be absent from the windows of every component of the resilience engine 128, i.e., every component is done with the data point(s) comprising that sensor data, then that sensor data is marked for deletion and the data management module 130 will delete the data point(s) comprising that marked sensor data to free up space in the memory 124.

In an exemplary embodiment, the method 200 can include block 204 of categorizing the sensor data into one or more sensor data types. Continuing with the example above, the sensor data from the commercial airplane would be categorized into GPS sensor data, IMU sensor data, and RADAR sensor data. In exemplary embodiments, the resilience engine 128 can further categorize the sensor data into one or more threat categories based on the sensor data type. For example, the threat categories for a GPS sensor can be GPS jamming, GPS spoofing, etc., and corresponding threat detection algorithms can be processes described in U.S. Pat. No. 8,922,427, incorporated herein by reference. In an exemplary embodiment, the categorization module 132 can be configured to execute the method of block 204.

In an exemplary embodiment, the method 200 can include block 206 of applying one or more threat detection algorithms to the sensor data based on the one or more sensor data types to detect one or more threats to the integrity of the sensor data. The resilience engine 128 may apply one or more algorithms contained in one or more of the threat detectors 112a-n in response to detecting a change in one or more characteristics of the sensor data received from the sensors 140a-n. The change in one or more characteristics of the sensor data may indicate a possible attack or other condition affecting the integrity of the sensor data output from the sensors 140a-n. In exemplary embodiments, the resilience engine 128 regularly updates the collection of threat detection algorithms comprising the then applicable threat detectors 112a-n stored in the remote threat library 110. In an exemplary embodiment, the integrity monitor module 136 can be configured to execute the method of block 206. Further, the integrity monitor module 136 may subscribe to notifications from the sensor data management module 130 that indicate whenever a new data point is available from any of the sensors 140a-n connected to the platform 150. When a new data point is available, the integrity monitor module 136 may probe the deployed threat library 126 to get a list of the threat detectors 112a-n that are capable of processing the particular data type of sensor data received from the sensor 140. The integrity monitor module 136 may queue for execution the latest window of sensor data from the sensor 140 that sent the newest data point along with all associated threat detectors 112a-n, and execute the threat detectors 112a-n (and thus their internal preprocessors/workers) on an internal thread pool, allowing parallel processing of sensor data. When a thread in the thread pool is available, the integrity monitor module 136 may pull the next process task out of the aforementioned queue to execute on the thread pool. When a process task completes, the integrity monitor module 136 captures its outputs, e.g., threat detection certainties and threat characteristics for each threat, as discussed in further detail below, to free up the thread from the pool to process the next task. In an exemplary embodiment, threat information collected or processed by the platform may be transmitted to systems associated with the remote threat platform in order to update the remote threat platform.

Threats, as used herein, can include software, data, or a sequence of commands that takes advantage of a vulnerability to cause unintended, unanticipated, undesirable, or harmful behavior (collectively, "harmful behavior") to occur on, without limitation, computer software, hardware, devices, appliances, vehicles, aircraft, communications, systems, networks, etc. (each individually or in combination, a "monitored system"). Such harmful behavior can include, without limitation, denying the availability of sensor data, affecting the integrity of sensor data, gaining control of a computer system, allowing privilege escalation, denial-of-service (DoS or related DDoS) attacks, etc. The harmful behavior can be identified by establishing a baseline of normal monitored system behavior, and then continuously monitoring the monitored system for unusual events or trends, for example, the presence of a signature particular to a threat, anomalous behavior in data characteristics or platform, device, or system behavior, anomalous behavior in sensor data rates, etc.

Threats can include a remote attack exploiting the vulnerability of a system without any prior access to the vulnerable system. Remote attacks may be performed via networks, RF communication, visual data, acoustical data, etc. It can include a local exploit of a system that that denies availability to the system's resources or affects the integrity of the system's sensor data.

Threats can be attacks as previously described but also can be conditions and circumstances not involving a bad actor, such as defective sensors or sensor protocols, environmental conditions affecting sensors such as magnetic fields, temperatures causing overheating, conditions causing sensor blindness, or errors in the communication channels from the sensor to where the data is used, etc. Threats can also be a combination of attacks by bad actors and the conditions and circumstances as described above that are not caused by bad actors.

Threats can attack one or more vulnerabilities of a sensor, which can include one or more weaknesses that can be exploited by the threat. Vulnerabilities can be caused by having physical connections, privileges, ports, protocols, services, and time on a network, and as the number or intensity of those that are present increases, the vulnerability of the sensor and associated platform and systems can also increase. Vulnerabilities can also be caused by fundamental operating system design flaws, such as when the sensor designer chooses to enforce suboptimal policies on user/program management.

In an exemplary embodiment, the method 200 can include block 208 of calculating a detection certainty for the sensor data from the at least one sensor, e.g., the one or more of the sensors 140a-n connected to the platform 150. The detection certainty indicates a probability that the one or more threats are affecting integrity of the sensor data received from the sensors 140a-n. For example, the sensor 140a may be a GPS sensor and a GPS spoofer could be running nearby, but the GPS spoofer is using a different frequency than the sensor 140a. Therefore, a threat is present but because the GPS spoofer is using the wrong frequency, it doesn't affect the sensor 140a and its output sensor data and the detection certainty would be zero. In an exemplary embodiment, the integrity monitor module 136 can be configured to execute the method of block 208. The integrity monitor module 136 calculates the detection certainties for the sensors 140a-n using the threat detectors 112a-n to determine the level of certainty that threats associated with the threat detectors 112a-n are affecting the integrity of sensor data received from one of the sensors 140a-n connected to the platform 150. In exemplary embodiments, the integrity monitor module 136 also uses the threat detectors 112a-n to calculate real-time characterizations of the detected threat such as, but not limited to, a direction from which the threat is coming, a power level of the threat, etc.

In an exemplary embodiment, the method 200 can include block 210 of generating a sensor trust metric for the sensor data of the at least one sensor, e.g., one or more of the sensors 140a-n, based on the detection certainty for the sensor data from the at least one sensor. The sensor trust metric indicates a confidence in the integrity of the sensor data of one or more sensor data types of the sensors 140a-n, the confidence being based on at least a potency of the threats to the integrity of the sensors' sensor data, and level of certainty of a presence of the threats to the sensors data. Continuing with the example above where the sensor 140a is a GPS sensor and there is a GPS spoofer nearby, but the GPS spoofer is using the wrong frequency, the detection certainty of a GPS threat to the sensor 140a would be zero and the sensor trust metric for the sensor 140a would be high, potentially 100% depending on potential other types of threats and mission parameters, as discussed below. The sensor trust metric can be a fuzzy indicator of trustworthiness of the sensor's data. The sensor trust metric can be calculated from a number of factors, including, but not limited to, the level of certainty that the sensor data's integrity or availability is being threatened by an attack or malfunction, as well as the risk of success that the attack or malfunction has to adversely affect mission success. In an exemplary embodiment, the at least one sensor, e.g., one or more of the sensors 140a-n, may provide multiple types of data and the generated sensor trust metric of the at least one sensor may be based on a calculated data stream trust metric for each of one or more data streams, where each data stream may include one or more data points, provided by the at least one sensor. For example, the sensor 140a may be a GPS sensor that provides both latitude and longitude data streams. Therefore, a data stream trust metric may be calculated for each of the latitude data stream and the longitude data stream. The data stream trust metrics for the latitude and longitude data streams may be combined to generate the sensor trust metric of the sensor 140a. Further, the sensor trust metrics of a plurality of sensors 140a-n may be combined to generate a system trust metric for a system of the platform 150. For example, the platform 15 may be a commercial airplane with an autopilot system that has a GPS sensor, an IMU sensor and a RADAR, e.g. sensors 140a, 140b, 140c. A sensor trust metric would be calculated for each of the sensors 140a-c and combined to generate a system trust metric for the autopilot system of the platform 150. It can be appreciated that in generating a sensor trust metric and/or a system trust metric, redundant data stream types and/or sensor types may be utilized. For example, a sensor may have two temperature data streams or a system may have two temperature sensors, etc. It can be further appreciated that the platform 150 may contain multiple systems with one or more sensors 140a-n. In an exemplary embodiment, the trust metric module 138 can be configured to execute the method of block 210.

The trustworthiness of the sensor data of the sensors 140a-n can be based on at least one of a potency of the threats that could impair the integrity of the sensor data, a level of certainty of a presence of the threats, and a level of acceptable risk that could be caused by the threats. For example, sensor data with a more potent threat can have a lower reliability than sensor data with a less potent threat.

The trust metric module 138 may modify the sensor trust metric of the sensors 140a-n and/or the system trust metric based on contextual information of a mission of the platform 150. The contextual information may comprise at least one or more expected characteristics of the type of mission being undertaken by the platform 150, such mission characteristics may include, but are not limited, to (i) expected likelihood of a type of threat affecting the type of the sensor during the type of the mission or platform use, (ii) environmental conditions that may impair the integrity of the sensor data or the data communication and processing capabilities of the platform 150, (iii) degree of accuracy required of sensor data based on consequences if the sensor data fails to achieve such degree of accuracy. For example, if the platform 150 is a missile, and the target is near a hospital or in a residential area, then accuracy is vital, whereas if the platform 150 is a supply ship on a non-urgent mission, there is wider leeway. In an exemplary embodiment, the platform data module 129 may receive the contextual information of a mission of the platform 150. The contextual information may be received as user input directly into the computing device 120 or the contextual information may be received from another computing device. For example, the contextual information may be received from an input device, such as, but not limited to, a keyboard, a microphone, a mouse, a touchscreen, etc.

Figure 3A:
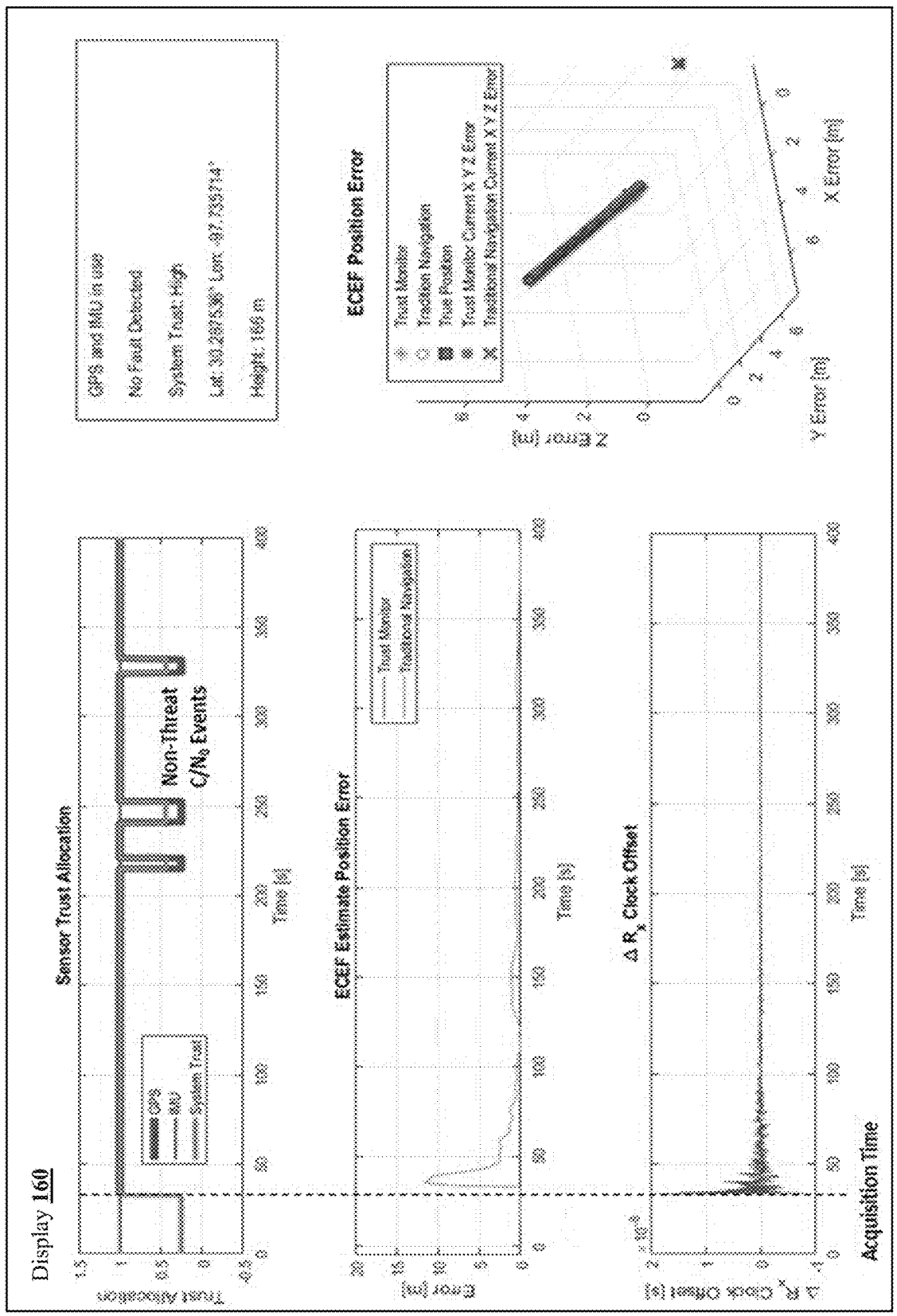
FIG. 3a illustrates exemplary experiment results from an exemplary embodiment of the present disclosure.
Figure 3B:
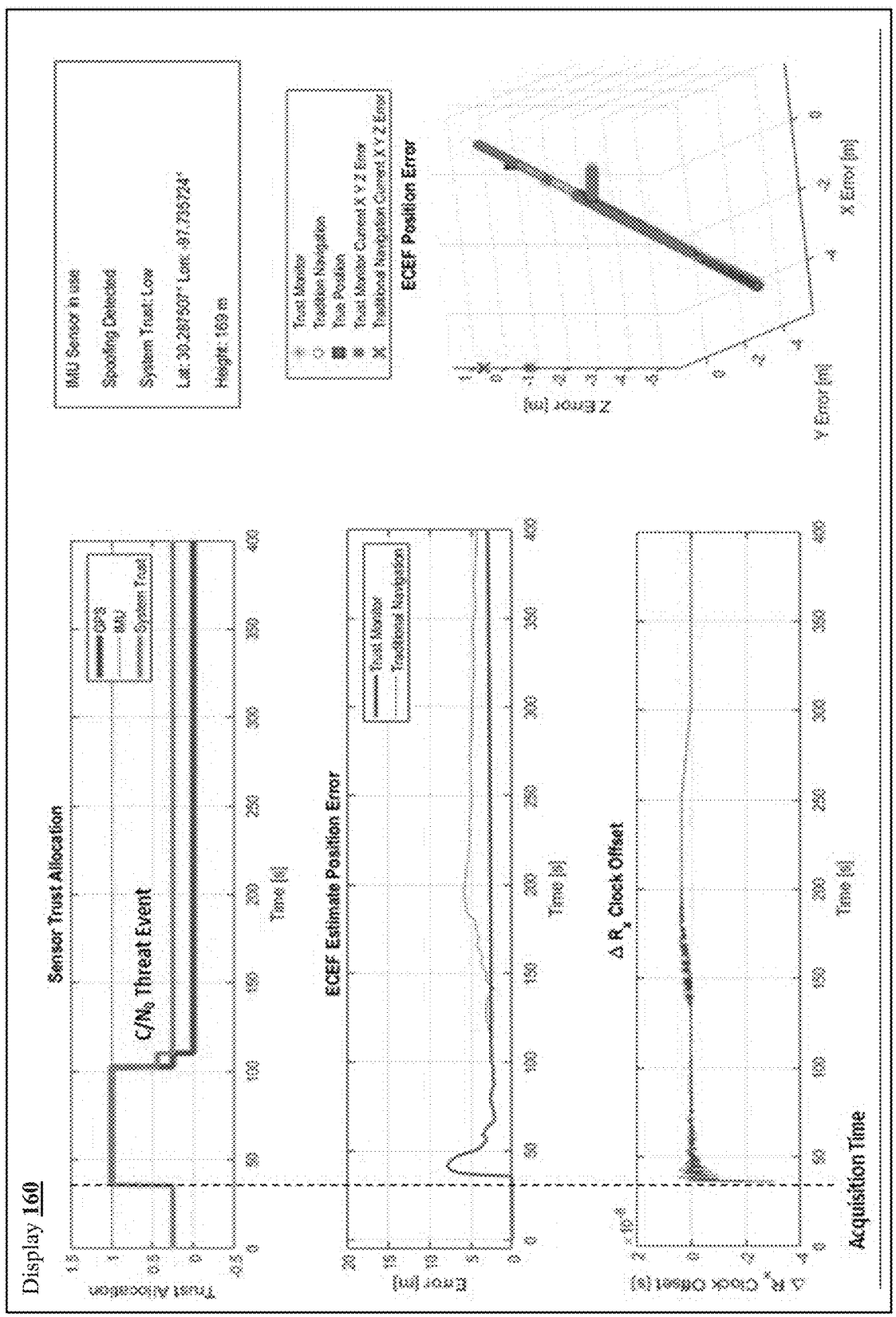
FIG. 3b illustrates exemplary experiment results from an exemplary embodiment of the present disclosure.
Figure 3C:
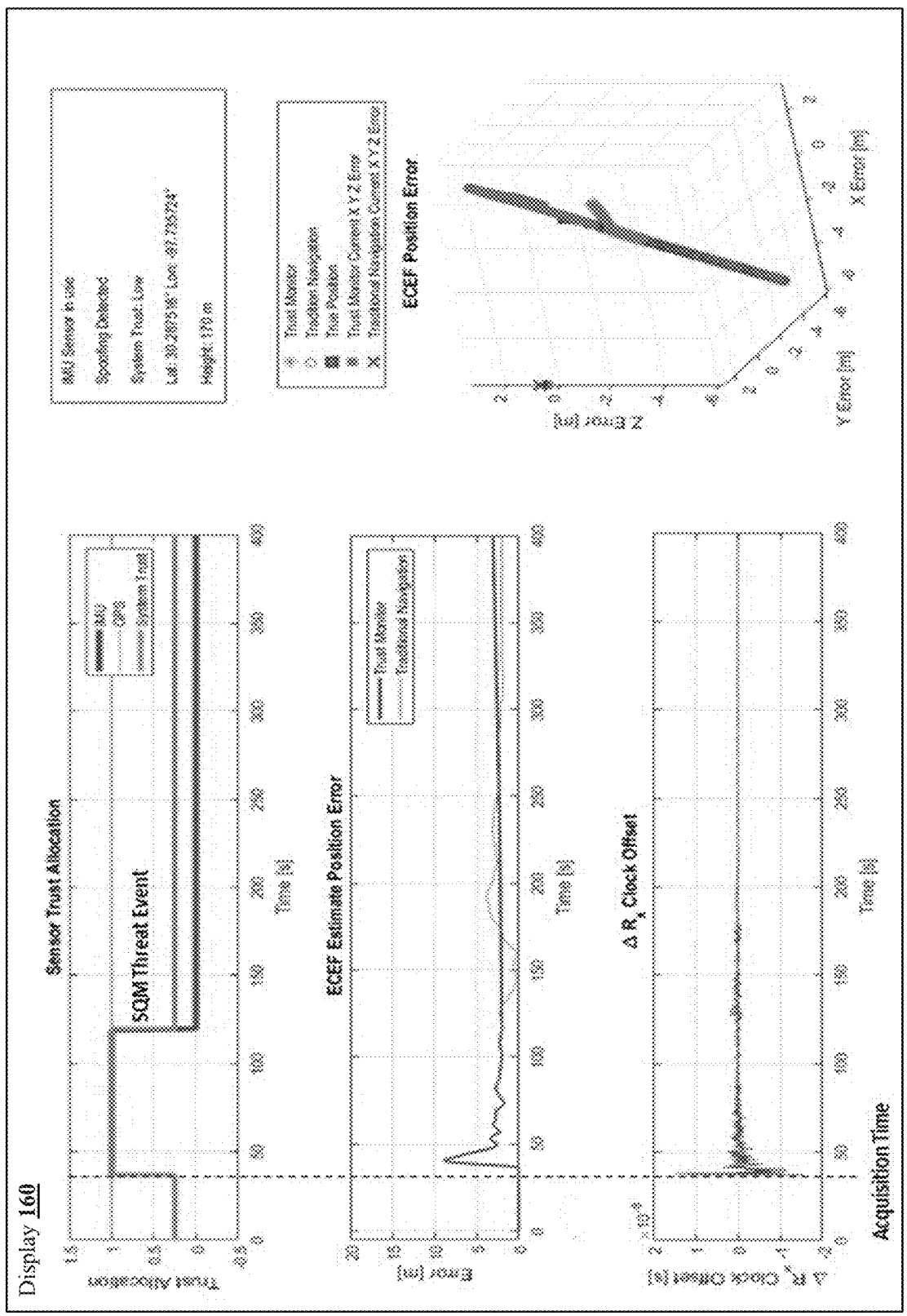
FIG. 3c illustrates exemplary experiment results from an exemplary embodiment of the present disclosure.

Further, the method 200 may include displaying the generated sensor trust metric for the at least one sensor, e.g., one or more of the sensors 140a-n connected to the platform 150, and/or the system trust metric for a system on the platform 150 on the display 160. Further, the sensor trust metric for the at least one sensor can be displayed with one or more data stream trust metrics depending on the sensor type. For example, FIGS. 3a-c depict example displays showing the trust metric for various sensors. FIG. 3a illustrates a display of a generated trust metric for a GPS sensor and an IMU sensor showing a high sensor trust metric and system trust metric indicating no threat to the sensors and/or system is detected. FIGS. 3b-3c illustrate a display of a generated trust metric for a GPS sensor and an IMU sensor showing a low trust metric indicating a spoofing threat affecting the data integrity of sensor data from the sensors is detected. In exemplary embodiments, the trust metric module 138 can be configured to display the generated trust metrics on the display 160.

In exemplary embodiments, the resilience engine 128 includes a fusion module 138. In embodiments where the platform 150 includes at least two sensors, e.g. the sensors 140a and 140b, the fusion module 138 can combine a generated first sensor trust metric for a first sensor, e.g., the sensor 140a, of a first type, e.g. a GPS sensor and a generated second sensor trust metric for a second sensor, e.g., the sensor 140b, of the first type to generate a combined sensor trust metric for the first sensor and the second sensor. The combined sensor trust metric being a weighted combination of the generated sensor trust metrics for the first sensor and the second sensor. Thus, the higher sensor trust metric of a first sensor relative to the trust metric of a second sensor will result in the sensor trust metric of the first sensor being assigned a higher weight than the sensor trust metric of the second sensor for calculating the combined sensor trust metric of both sensors. Alternately, the combining can be based on a weighted average of the noise characteristics of multiple sensors 140, such that the greater the noise with respect to a sensor, the lower the weight assigned to that sensor's sensor trust metric for calculating the weighted average sensor trust metric of all the multiple sensors 140. Of course, the combining can be based on the combination of the weighted averages. The combining can also be based on a simple average, or other known ways of combining data. The combining can generate a single sensor trust metric for the sensors for which associated trust metrics were combined. For example, the fusion module 138 can combine sensor data from a GPS sensor A, e.g., the sensor 140*a*, and GPS sensor B, e.g., the sensor 140*b*. The GPS sensor A can have a sensor trust metric of 10% and GPS sensor B can have a sensor trust metric of 80%. If the separate sensor trust metrics are used to mitigate associated threats, then a threat defense system may choose to mostly ignore sensor data from GPS sensor A and mostly rely on sensor data from GPS sensor B. However, if the combined sensor trust metric resulting from the combination of each sensor's respective sensor data trust metric is used, then the combined sensor trust metric for sensor data from GPS sensor A or GPS sensor B will be the weighted combination meaning that sensor data from GPS sensor A will be given greater reliance than its individual sensor trust metric indicated and sensor data from GPS sensor B will be given less reliance than its individual sensor trust metric indicated.

As another example, the platform 150 may have a GPS GNSS sensor, a Galileo GNSS sensor, and an IMU sensor. The resilience engine 128 may detect a jamming threat on the GPS GNSS sensor, reducing its calculated sensor trust metric down to 10% and effectively ignoring sensor data from the GPS GNSS sensor altogether. The fusion module 138 works to fuse location data from the GPS GNSS sensor, Galileo GNSS sensor, and the IMU sensor. When the GPS GNSS sensor effectively goes offline from jamming, a fused location can still be calculated from the Galileo GNSS and IMU sensors, providing location sensing that is robust to threats. The fusion module 138 may use a modified Kalman Filter that fuses data together from multiple sensors, e.g., the sensors 140*a-n*, based on real-time sensor trust metrics levels of each sensor 140 as well as the noise characteristics of the sensors 140. The fusion module 138 can be statically or dynamically configured for Kalman Filter fusion of the attached sensors 140 (including tuning parameters) and each time a new data point is received from a sensor 140, the fusion module 138 accesses the new data point, along with the latest trust metric of the originating sensor 140, and performs an update to calculate the new combined trust metric. Consumers and/or components of the resilience engine 128 may subscribe to the fusion module 138 to be notified of new sensor data fused from one or more of the originating sensors.

Figure 4:
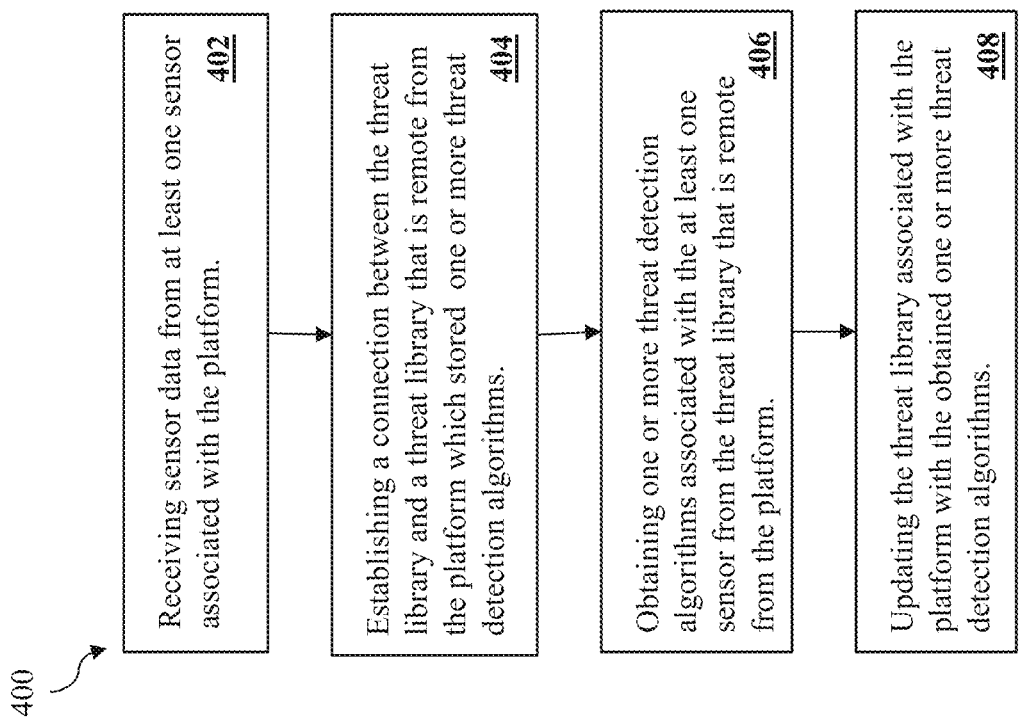
FIG. 4 illustrates an exemplary flowchart of an exemplary method for updating a local threat library deployed on a platform.

FIG. 4 illustrates an exemplary flowchart of an exemplary method 400 for updating a local threat library deployed on a platform.

In an exemplary embodiment, the method 400 can include block 402 of receiving sensor data from at least one sensor, e.g., sensor 140*a*, associated with the platform 150. In exemplary embodiments, the sensor data management module 130 can be configured to execute the method of block 402.

In an exemplary embodiment, the method 400 can include block 404 of establishing a connection between the local threat library, e.g., the deployed threat library 126, and a remote threat library that is not deployed on the platform 150, e.g., the remote threat library 110, which stores one or more threat detection algorithms, e.g., the threat detectors 112*a-n*. In an exemplary embodiment, the threat library update module 139 can be configured to execute the method of block 404.

In an exemplary embodiment, the method 400 can include block 406 of obtaining one or more threat detection algorithms, e.g., the threat detectors 112*a-n*, associated with the at least one sensor, e.g., the sensor 140*a*, from a remote threat library that is not deployed on the platform 150, e.g., the remote threat library 110. In an exemplary embodiment, the threat library update module 139 can be configured to execute the method of block 406.

In an exemplary embodiment, the method 400 can include block 408 of updating the local threat library, e.g., the local threat library 126, associated with the platform 150, with the obtained one or more threat detection algorithms, e.g., the threat detectors 112*a-n*. In an exemplary embodiment, threat library update module 139 can be configured to execute the method of block 408.

Updates to the remote threat library 110 (e.g., new or updated threat detectors) can be synchronized to the local threat library 126 in order to keep the local threat library 126 up to date. These updates may be done over the air, over wire, or through some other medium. They may be performed in an automated fashion, or manually in certain cases. This enables platforms deployed in operational environments to keep up to date with the latest available threat detection algorithms.

The following provides an example timeline illustrating the methods 200 and 400 in accordance with exemplary embodiments.

At an initial time, an airplane, e.g., the platform 150, outfitted with GPS, IMU, and RADAR sensors, e.g., sensors 140, may be retrofitted with the resilience engine 128. On a first run, the airplane's resilience engine connects to the remote threat library 110 through a local area network (LAN) internet connection in its maintenance hangar and downloads all available threat detectors 112*a-n* that are relevant to the airplane's sensors from the remote threat library 110. The airplane's resilience engine is now fully synchronized with those threat detectors that are relevant to the airplane's sensors from the threat detectors 112*a-n* in the remote threat library 110, meaning the airplane's resilience engine has all of the latest versions of the threat detectors for its GPS, IMU, and RADAR sensors to the extent available in the versions of threat detectors 112*a-n* in the remote threat library 110.

At a first later time, e.g., a month, the airplane is about to take its first flight since having the resilience engine 128 retrofitted and first synchronized. Once the airplane is started, and all of its subsystems are turned on, the resilience engine 128 boots up, and immediately starts receiving sensor data from the airplane's sensors, e.g., the sensors 140*a-n*. The resilience engine 128 immediately starts processing the sensor data in real-time, providing the flight computer, e.g., the computing device 120, and pilots via the display 160, with threat detection/characterization information, as well as sensor trust metrics for each sensor 140 and can include sensor system trust metrics that are the result of fusing trust metrics for (i) data streams of the same data type from redundant systems, or (ii) data streams having related physical, functional, or other system relationships, or (iii) any combination of the foregoing. The airplane takes off, and at cruising altitude, the pilots give control to the airplane's autopilot system, which uses all of the airplane's sensors, e.g., the sensors 140*a-n*, to provide automatic course corrections. Throughout the entire flight, the resilience engine 128 is processing sensor data in real-time, looking for threats that may be affecting the integrity of the sensor data. Halfway through the flight, a malicious actor begins to remotely spoof GPS signals in the vicinity of the airplane in an attempt to steer the airplane's autopilot off of the originally intended course. The resilience engine 128 immediately detects the presence of the spoofing signals in the GPS sensor's sensor data and begins outputting non-zero detection certainties (in this case, 75% certainty that a spoofing attack is occurring on the GPS sensor data). Even though the GPS sensor data is being spoofed, the resilience engine 128 fusion component, e.g., the fusion module 138, can still provide reliable position data for a short time by reducing the GPS sensor's contribution of sensor data to the fused position data, making the fused position weighted to rely mostly on sensor data from the airplane's IMU sensor and RADAR sensor, each of which has a sensor trust metric of 100%. The resilience engine 128 immediately notifies both the autopilot system and the pilots that there is a certainty of 75% that the sensor data from the GPS sensor is being spoofed and the sensor trust metric for that sensor data is only 10% based on the level of acceptable risk for the commercial flight. The pilot sees this notification, e.g., via the display 160, and lets the autopilot continue to function using the resilience engine's fused position data from the IMU sensor and RADAR sensor, which are still believed to be providing reliable sensor data even though the sensor data of the GPS sensor is being spoofed. The pilot continuously monitors the resilience engine 128 trust metric outputs, e.g., fused and individual sensor trust metrics, to assess if the autopilot has sufficiently trustworthy sensor data from its sensors to maintain proper operation. If the resilience engine 128 begins to show a low trust metric for the fused position data for any reason, the autopilot can automatically shut itself off or the pilot can choose to disable the autopilot for manual control. After experiencing 5 minutes of spoofing in the sensor data from the GPS sensor, the airplane manages to put enough distance between it and the malicious actor so that the spoofing signals can no longer reach the airplane. The airplane with its retrofitted resilience engine 128 was able to detect the spoofing attack at onset and provide information to assist the plane and its pilot to immediately, and for the duration of the threat, mitigate the harm from the threat, and continue following the original flight path even in the presence of the attack. Without resilience engine 128, the airplane would have either 1) not detected the spoofing event, allowing the malicious actor to remotely modify the course of the airplane by misleading its autopilot, or 2) if its GPS sensor had onboard spoofing detection, it would have detected the spoofing event and immediately turned off the autopilot system, forcing the pilot to take manual control.

At a second later time, e.g., 5 months after the resilience engine 128 was retrofitted onto the airplane, a malicious actor developed a new type of GPS spoofing attack (called Threat Z). The airplane has a sophisticated GPS sensor with built-in GPS spoofing detection. However, this new type of spoofing attack is not detectable by the GPS sensor. The US DoD has learned about this new type of threat, and immediately begins developing a new threat detector to protect all American assets from the new threat, including commercial airliners such as this airplane. Within 1 week of learning of the new threat's existence, a new threat detector is developed, validated, and uploaded to the remote threat library 110.

At a third later time, e.g., 5.5 months after the resilience engine 128 was retrofitted onto the airplane, the airplane takes off for its first flight since the new spoofing threat (Threat Z) appeared. While in the air, the resilience engine 128 uses the airplane's satellite communications interne link to check the remote threat library 110 for any updated threat detectors 112*a-n*. The resilience engine 128 sees that the remote threat library 110 has a new threat detector to address a new threat (Threat Z) to one or more of the airplane's sensors, and immediately downloads it. The resilience engine 128 immediately starts processing sensor data from the GPS sensor with the new threat detector for Threat Z. While flying, the airplane's GPS sensor is attacked by Threat Z which is detected and mitigated exactly as described in the "Time=1 month" example. The major difference here is that a new threat was introduced, identified, and mitigated by rapid development and deployment of an associated threat detector via the remote threat library 110. If the airplane had not been retrofitted with the resilience engine 128, its GPS sensor would not have been able to detect Threat Z because today's GPS receiver manufacturers are unable to rapidly develop and deploy updated threat detection technologies to GPS receivers that are operating in the field. The result may have been that the malicious actor would have been able to alter the course of the airplane with a GPS spoof attack, e.g., steering it into enemy-controlled airspace.

A person having ordinary skill in the art would appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, one or more of the disclosed modules can be a hardware processor device with an associated memory.

A hardware processor device as discussed herein can be a single hardware processor, a plurality of hardware processors, or combinations thereof. Hardware processor devices can have one or more processor "cores." The term "non-transitory computer readable medium" as discussed herein is used to generally refer to tangible media such as a memory device.

Various embodiments of the present disclosure are described in terms of an exemplary computing device. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

A system, as used herein, can be in combination with one or more nodes, wherein the system resides in the one or more nodes. A node can be configured to interface or contain one or more components of the systems described herein.

A hardware processor, as used herein, can be a special purpose or general purpose processor device. The hardware processor device can be connected to a communications infrastructure, such as a bus, message queue, network, multi-core message-passing scheme, etc. An exemplary computing device, as used herein, can also include a memory (e.g., random access memory, read-only memory, etc.), and can also include one or more additional memories. The memory and the one or more additional memories can be read from and/or written to in a well-known manner. In an embodiment, the memory and the one or more additional memories can be non-transitory computer readable recording media.

Data stored in the exemplary computing device (e.g., in the memory) can be stored on any type of suitable computer readable media, such as optical storage (e.g., a compact disc, digital versatile disc, Blu-ray disc, etc.), magnetic tape storage (e.g., a hard disk drive), or solid-state drive. An operating system can be stored in the memory.

In an exemplary embodiment, the data can be configured in any type of suitable database configuration, such as a relational database, a structured query language (SQL) database, a distributed database, an object database, etc. Suitable configurations and storage types will be apparent to persons having skill in the relevant art.

The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc.

Memory semiconductors (e.g., DRAMs, etc.) can be means for providing software to the computing device. Computer programs (e.g., computer control logic) can be stored in the memory. Computer programs can also be received via the communications interface. Such computer programs, when executed, can enable the computing device to implement the present methods as discussed herein. In particular, the computer programs stored on a non-transitory computer-readable medium, when executed, can enable a hardware processor device to implement the exemplary methods, or similar methods, as discussed herein. Accordingly, such computer programs can represent controllers of the computing device.

Where the present disclosure is implemented using software, the software can be stored in a computer program product or non-transitory computer readable medium and loaded into the computing device using a removable storage drive or communications interface. In an exemplary embodiment, any computing device disclosed herein can also include a display interface that outputs display signals to a display unit, e.g., LCD screen, plasma screen, LED screen, DLP screen, CRT screen, etc.

It will be appreciated by those skilled in the art that the present disclosure can be embodied in other specific forms without departing from the spirit or essential characteristics thereof. The presently disclosed embodiments are therefore considered in all respects to be illustrative and not restrictive. The scope of the disclosure is indicated by the appended claims rather than the foregoing description, and all changes that come within the meaning, range, and equivalence thereof are intended to be embraced therein.

What is claimed is:

1. A method for generating a trust metric for sensor data, the method comprising:
   receiving the sensor data from at least one sensor associated with a platform;
   generating a plurality of operable components for performing threat detection by the one or more threat detectors;
   comparing a sensor data need of one operable component with every other operable component of the plurality of components;
   storing a specified amount of the received sensor data in memory according to a window size determined by a comparison result;
   receiving contextual information that specifies characteristics of a mission undertaken by the platform, the characteristics identifying at least environmental conditions that may impair an integrity of the stored sensor data and a degree of accuracy required of the sensor;
   categorizing the stored sensor data into one or more sensor data types;
   executing the plurality of operable components by applying one or more threat detection algorithms to the stored sensor data based on the one or more sensor data types to detect one or more threats to the integrity of the stored sensor data;
   calculating a detection certainty from characteristics of the sensor data of the at least one sensor by comparing the stored sensor data to threats in a threat library, the detection certainty indicating a probability that the one or more threats are affecting the integrity of the stored sensor data;
   generating a trust metric for the stored sensor data of the at least one sensor based on the detection certainty for the stored sensor data from the at least one sensor; and
   modifying the trust metric for the stored sensor data based on the contextual information.

2. The method of claim 1, comprising:
   generating a first data stream trust metric for a first data stream of a first data type of the at least one sensor;
   generating a second data stream trust metric for at least one second data stream of a second data type of the at least one sensor;
   generating a sensor trust metric for the at least one sensor wherein the sensor trust metric is generated by combining the first data stream trust metric and the at least one second data stream trust metric to generate the sensor trust metric.

3. The method of claim 2, wherein the platform is associated with at least two sensors, the method comprising:
   generating a first sensor trust metric for a first sensor;
   generating a second sensor trust metric for a second sensor; and
   generating a system trust metric for the at least two sensors of the platform, the system trust metric being a combination of the first sensor trust metric and the second sensor trust metric.

4. The method of claim 1, comprising:
   detecting change in one or more characteristics of the stored sensor data from the at least one sensor, the change indicating a possible attack on or compromise of the integrity of the stored sensor data from the at least one sensor.

5. The method of claim 1, comprising:
   categorizing the sensor data into one or more threat categories based on the sensor data types; and
   applying one or more threat detection algorithms to the stored sensor data based on the one or more threat categories.

6. The method of claim 1, comprising:
   setting one or more thresholds for each trust metric, where each trust metric that is below a corresponding threshold is deemed to indicate a compromise of the integrity of the stored sensor data from the associated sensor due to a threat.

7. The method of claim 4, comprising:
   for each sensor for which a trust metric indicates a deemed compromise of integrity, determining one or more characterizations of the one or more threats to the sensor data, the one or more characterizations including at least one of a threat origin, a threat strength, a threat direction, potential threat behaviors, potential threat harm, or a known threat actor.

8. The method of claim 1, wherein the platform is associated with at least two sensors, the at least two sensors providing the same sensor data type, the method comprising:

generating a first sensor trust metric based on the stored sensor data of a first data type from a first sensor of a first sensor type;

generating a second sensor trust metric based on the stored sensor data of the first data type from a second sensor of the first sensor type;

generating a combined sensor trust metric for the first and second sensors, the combined sensor trust metric being a weighted combination of the first sensor trust metric and the second sensor trust metric.

9. The method of claim 1, wherein the one or more threat detection algorithms are implemented using a threat detector having one or more threat detection algorithms for a single threat type in association with one or more sensor data types.

10. The method of claim 1, wherein the one or more threat detection algorithms are implemented using a threat detector having one or more threat detection algorithms for one or more threat types in association with one or more sensor data types.

11. The method of claim 1, comprising:
retrieving one or more of the threat detection algorithms from a threat library that is remote from the platform, where the threat library stores one or more threat detection algorithms for one or more threats; and
storing the retrieved threat detection algorithms in a threat library stored locally on the platform.

12. The method of claim 1, wherein at least one of the sensors is located on the platform.

13. The method of claim 1, wherein at least one of the sensors is connected to the platform.

14. The method of claim 1, wherein the at least one sensor comprises:
at least one of a global positioning system (GPS) sensor, inertial measurement unit (IMU) sensor, accelerometers, gyroscopes, an optical sensor, a magnetometer, a RADAR, a network traffic sensor, or a network security sensor.

15. The method of claim 1, wherein the window size is associated with a data capture window that includes N amount of the most recently captured sensor data from the sensor.

16. A system for generating a trust metric for sensor data, the system comprising:
at least one sensor associated with a platform and configured to provide sensor data;
a device configured to receive contextual information that specifies characteristics of a mission undertaken by the platform, the characteristics identifying at least environmental conditions that may impair an integrity of the sensor data and a degree of accuracy required of the sensor;
a processor for executing program code for running one or more threat detectors, the program code causing the processor to be configured to:
generate a plurality of operable components for performing threat detection by the one or more threat detectors;
compare a sensor data need of one operable component with every other operable component of the plurality of components;
store a specified amount of the received sensor data in memory according to a window size determined by a comparison result;
categorize the stored sensor data into one or more sensor data types;
execute the plurality of operable components by applying one or more threat detection algorithms to the stored sensor data based on the one or more sensor data types to detect one or more threats to the integrity of the stored sensor data;
calculate a detection certainty from characteristics of the at least one sensor by comparing the stored sensor data to threats in a threat library, the detection certainty indicating a probability that the one or more threats are affecting the integrity of the stored sensor data of one or more sensor data types;
a trust module configured to calculate a trust metric for the stored sensor data of the at least one sensor based on the detection certainty for the stored sensor data from the at least one sensor; and
the trust module being further configured to modify the trust metric for the stored sensor data based on the contextual information.

17. The system of claim 16, wherein the plurality of operable components include:
a trust module configured to generate a first data stream trust metric for a first data stream of a first data type of the at least one sensor;
the trust module configured to generate a second data stream trust metric for at least one second data stream of a second data type of the at least one sensor; and
a fusion module configured a sensor trust metric for the at least one sensor wherein the sensor trust metric is generated by combining the first data stream trust metric and the at least one second data stream trust metric to generate the sensor trust metric.

18. The system of claim 17, wherein the platform is associated with at least two sensors, wherein the plurality of operable components include:
a trust module configured to generate a first sensor trust metric for a first sensor;
the trust module configured to generate a second sensor trust metric for a second sensor; and
a fusion module configured to generate a system trust metric for the at least two sensors of the platform, the system trust metric being a combination of the first sensor trust metric and the second sensor trust metric.

19. The system of claim 16, wherein the plurality of operable components includes:
a threat detection module configured to detect change in one or more characteristics of the stored sensor data from the at least one sensor, the change indicating one or more possible attacks on or compromise of the integrity of the stored sensor data from the at least one sensor.

20. The system of claim 16, wherein the plurality of operable components include at least a categorization module configured to:
categorize the stored sensor data into one or more threat categories based on the sensor data types; and
apply one or more threat detection algorithms to the stored sensor data based on the one or more threat categories.

21. The system of claim 16, where in the trust module is configured to:
set one or more thresholds for each trust metric, where each trust metric that is below a corresponding threshold is deemed to indicate a compromise of the integrity of the stored sensor data from the associated sensor due to a threat.

22. The system of claim 19, comprising:
for each of the one or more sensors for which a trust metric indicates a deemed compromise of integrity, the integrity monitor module is configured to determine one or more characterizations of the one or more threats to the stored sensor data from the sensor, the one or more characterizations including at least one of a threat origin, a threat strength, a threat direction, potential threat behaviors, potential threat harm, or a known threat actor.

23. The system of claim 16, wherein the platform is associated with at least two sensors and the at least two sensors provide sensor data of the same sensor data type, and the plurality of operable components include:
a trust module configured to generate a first sensor trust metric based on the sensor data of a first sensor data type of a first sensor type and a second sensor trust metric based on the sensor data of the first sensor data type of a second sensor of the first sensor type; and
a fusion module configured to generate a combined sensor trust metric for the first and second sensors, the combined sensor trust metric being a weighted combination of the first sensor trust metric and the second sensor trust metric.

24. The system of claim 16, wherein the one or more threat detection algorithms are implemented using a threat detector having one or more threat detection algorithms for a single threat type in association with one or more sensor data types.

25. The system of claim 16, wherein the one or more threat detection algorithms are implemented using a threat detector having one or more threat detection algorithms for one or more threat types in association with one or more sensor data types.

26. The system of claim 16, comprising:
a receiving device configured to retrieve one or more of the threat detection algorithms from a threat library that is remote from the platform where the threat library stores one or more threat detection algorithms for one or more threats; and
a memory located on the platform and configured to store the retrieved threat detection algorithms in a threat library stored locally on the platform.

27. The system of claim 16, wherein at least one of the sensors is located on the platform.

28. The system of claim 16, wherein at least one of the sensors is connected to the platform.

29. The system of claim 16, wherein the at least one sensor comprises:
at least one of a global positioning system (GPS) sensor, inertial measurement unit (IMU) sensor, accelerometers, gyroscopes, an optical sensor, a magnetometer, a RADAR, a network traffic sensor, or a network security sensor.

30. The system of claim 16, wherein the window size is associated with a data capture window that includes N amount of the most recently captured sensor data from the sensor.

31. A computer program product for generating a trust metric for sensor data, the computer program product comprising:
a computer-readable storage medium having program instructions embodied therein, the program instructions being executable by a computer to cause the computer to perform a method which includes:
receiving the sensor data from at least one sensor associated with a platform;
generating a plurality of operable components for performing threat detection by the one or more threat detectors;
comparing a data need of one operable component with every other operable component of the plurality of components;
storing a specified amount of the received sensor data in memory according to a window size determined by a comparison result;
receiving contextual information that specifies characteristics of a mission undertaken by the platform, the characteristics identifying at least environmental conditions that may impair an integrity of the sensor data and a degree of accuracy required of the sensor;
categorizing the stored sensor data into one or more sensor data types;
executing the plurality of operable components by applying one or more threat detection algorithms to the stored sensor data based on the one or more sensor data types to detect one or more threats to the integrity of the sensor data;
calculating a detection certainty from characteristics of the stored sensor data of the at least one sensor by comparing the stored sensor data to threats in a threat library, the detection certainty indicating a probability that the one or more threats are affecting the integrity of the sensor data;
generating a trust metric for the sensor data of the at least one sensor based on the detection certainty for the stored sensor data from the at least one sensor; and
modifying the trust metric for the stored sensor data based on the contextual information.

32. The computer program product of claim 31, comprising:
generating a first data stream trust metric for a first data stream of a first data type of the at least one sensor;
generating a second data stream trust metric for at least one second data stream of a second data type of the at least one sensor;
generating a sensor trust metric for the at least one sensor wherein the sensor trust metric is generated by combining the first data stream trust metric and the at least one second data stream trust metric to generate the sensor trust metric.

33. The computer program product of claim 32, wherein the platform is associated with at least two sensors, the method comprising:
generating a first sensor trust metric for a first sensor;
generating a second sensor trust metric for a second sensor; and
generating a system trust metric for the at least two sensors of the platform, the system trust metric being a combination of the first sensor trust metric and the second sensor trust metric.

34. The computer program product of claim 31, comprising:
detecting change in one or more characteristics of the stored sensor data from the at least one sensor, the change indicating a possible attack on or compromise of the integrity of the stored sensor data from the at least one sensor.

35. The computer program product of claim 31, comprising:
categorizing the stored sensor data into one or more threat categories based on the sensor data types; and
applying one or more threat detection algorithms to the stored sensor data based on the one or more threat categories.

36. The computer program product of claim 31, comprising:
setting one or more thresholds for each trust metric, where each trust metric that is below a corresponding threshold is deemed to indicate a compromise of the integrity of the stored sensor data from the associated sensor due to a threat.

37. The computer program product of claim 34, comprising:
for each sensor for which a trust metric indicates a deemed compromise of integrity, determining one or more characterizations of the one or more threats to the stored sensor data, the one or more characterizations including at least one of a threat origin, a threat strength, a threat direction, potential threat behaviors, potential threat harm, or a known threat actor.

38. The computer program product of claim 31, wherein the platform is associated with at least two sensors, the at least two sensors providing similar sensor data, the method comprising:
generating a first sensor trust metric based on the stored sensor data of a first data type from a first sensor of a first sensor type;
generating a second sensor trust metric based on the stored sensor data of the first data type from a second sensor of the first sensor type;
generating a combined sensor trust metric for the first and second sensors, the combined sensor trust metric being a weighted combination of the first sensor trust metric and the second sensor trust metric.

39. The computer program product of claim 31, wherein the one or more threat detection algorithms are implemented using a threat detector having one or more threat detection algorithms for a single threat type in association with one or more sensor data types.

40. The computer program product of claim 31, wherein the one or more threat detection algorithms are implemented using a threat detector having one or more threat detection algorithms for one or more threat types in association with one or more sensor data types.

41. The computer program product of claim 31, comprising:
retrieving one or more of the threat detection algorithms from a threat library that is remote from the platform, where the threat library stores one or more threat detection algorithms for one or more threats; and
storing the retrieved threat detection algorithms in a threat library stored locally on the platform.

42. The computer program product of claim 31, wherein at least one of the sensors is located on the platform.

43. The computer program product of claim 31, wherein at least one of the sensors is connected to the platform.

44. The computer program product of claim 31, wherein the at least one sensor comprises:
at least one of a global positioning system (GPS) sensor, inertial measurement unit (IMU) sensor, accelerometers, gyroscopes, an optical sensor, a magnetometer, a RADAR, a network traffic sensor, or a network security sensor.

45. A method for updating a threat library deployed on a platform, the method comprising:
receiving sensor data from at least one sensor associated with the platform wherein the sensor data includes a plurality of new data points detected by the at least one sensor;
executing, by a processor, program code for running one or more threat detectors, the program code causing the processor to perform operations including:
generating a plurality of operable components for performing threat detection by the one or more threat detectors;
storing a specified amount of the new data points according to a window size determined by a sensor data need of each operable component;
establishing a connection between the threat library deployed on the platform and a threat library that is remote from the platform where the remote threat library stores one or more threat detection algorithms;
obtaining one or more threat detection algorithms associated with processing the stored new data points from the threat library that is remote from the platform; and
updating the threat library deployed on the platform with the obtained one or more threat detection algorithms.

46. A system for updating a threat library deployed on a platform, the system comprising:
the platform and at least one associated sensor configured to provide sensor data;
a processor for executing program code for running one or more threat detectors, the program code causing the processor to be configured to:
generate a plurality of operable components for performing threat detection by the one or more threat detectors;
receive the sensor data from the at least one sensor, wherein the sensor data includes one or more new data points received within a specified window from the at least one sensor;
store a specified amount of the new data points according to a window size determined by a sensor data need of each operable component;
obtain threat detection algorithms pertaining to the stored new data points from a threat library that is remote from the platform, wherein the remote threat library contains one or more threat detection algorithms associated with processing the stored new data points; and
update the threat library deployed on the platform with the obtained one or more threat detection algorithms.

* * * * *